(12) United States Patent
Takagi

(10) Patent No.: US 7,058,674 B2
(45) Date of Patent: Jun. 6, 2006

(54) RANDOM NUMBER DATA GENERATOR

(75) Inventor: Shunsuke Takagi, Kanagawa (JP)

(73) Assignee: Sony Corporation (JP)

( * ) Notice: Subject to any disclaimer, the term of this patent is extended or adjusted under 35 U.S.C. 154(b) by 625 days.

(21) Appl. No.: 10/375,262

(22) Filed: Feb. 28, 2003

(65) Prior Publication Data

US 2003/0208517 A1   Nov. 6, 2003

(30) Foreign Application Priority Data

May 3, 2002 (JP) .......................... P2002-059270

(51) Int. Cl.
*G06F 7/58* (2006.01)
(52) U.S. Cl. ..................................... 708/251
(58) Field of Classification Search ............... 708/251
See application file for complete search history.

(56) References Cited

U.S. PATENT DOCUMENTS

| | | | | |
|---|---|---|---|---|
| 5,117,380 A | * | 5/1992 | Tanagawa | 708/251 |
| 6,065,029 A | * | 5/2000 | Weiss | 705/251 |
| 6,480,072 B1 | * | 11/2002 | Walsh et al. | 331/78 |
| 2002/0186086 A1 | * | 12/2002 | Curiger et al. | 331/78 |
| 2003/0037079 A1 | * | 2/2003 | Wilber | 708/250 |
| 2003/0135527 A1 | * | 7/2003 | Lundberg | 708/250 |

* cited by examiner

*Primary Examiner*—D. H. Malzahn
(74) *Attorney, Agent, or Firm*—Rader, Fishman & Grauer, PLLC; Ronald P. Kananen

(57) ABSTRACT

A random number data generator includes a plurality of oscillation units and an AND circuit for outputting random number data produced in at least one oscillation unit when each of the entire oscillation units has oscillated a predetermined number of times, wherein high-reliability random number data can be generated efficiently.

13 Claims, 3 Drawing Sheets

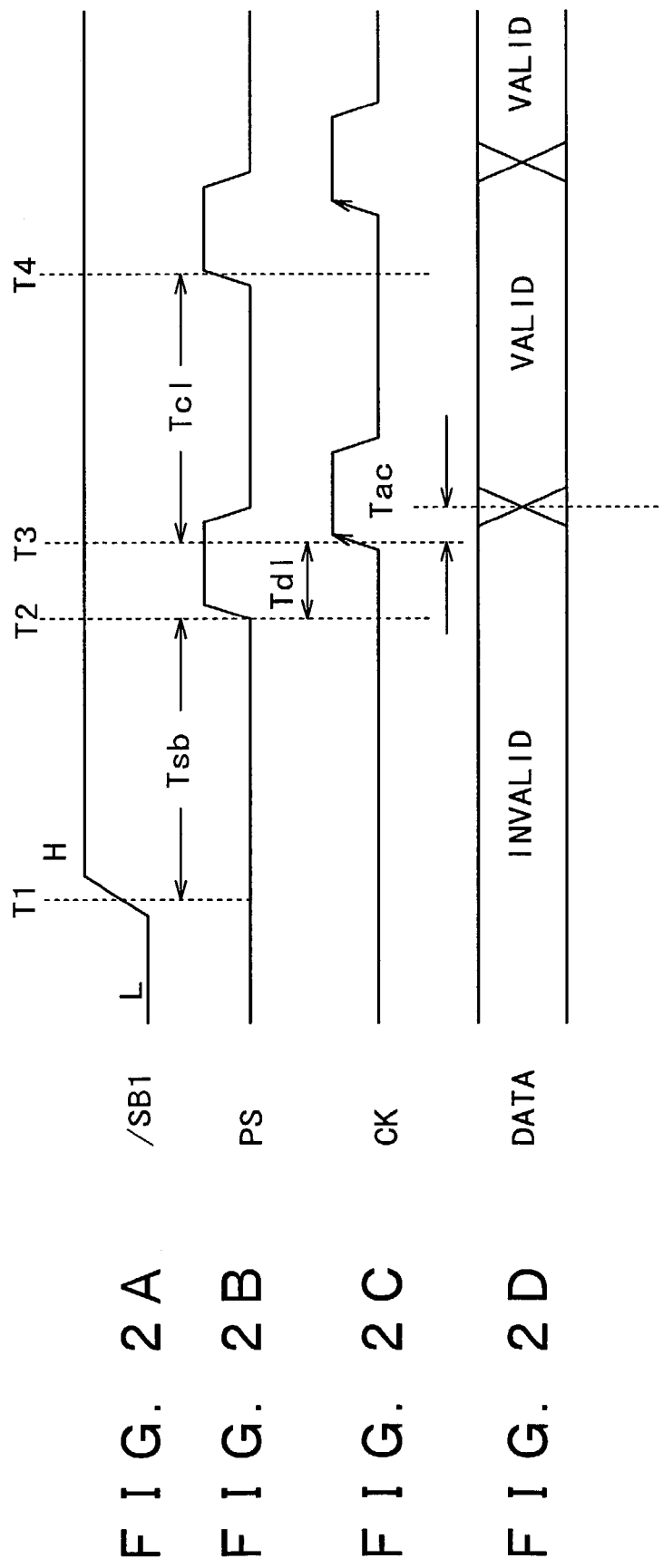
FIG. 2A
FIG. 2B
FIG. 2C
FIG. 2D
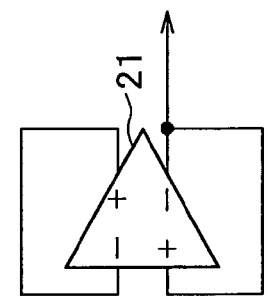
FIG. 3

RANDOM NUMBER DATA GENERATOR

BACKGROUND OF THE INVENTION

The present invention relates to a random number data generator capable of outputting data at random timings.

There has been contrived heretofore a random number data generator which outputs data at random timings (random number data) by employing an oscillator. Here, the random number data generator is a circuit to generate random number data by utilizing variations of the output timings, wherein the security of the whole system can be enhanced by the use of such random number data.

In order to secure sufficiently the variations of the output timings, the cycle of outputting the random number data is set to be much longer than the oscillation cycle of the oscillator.

In case the random number data are used in a logic circuit, the random number data generator latches the output signal of the oscillator in synchronism with a system clock signal of the logic circuit and then outputs the latched signal as random number data.

However, since the oscillation cycle of the oscillator is unstable to any change of a supply voltage or the like, it has been customary that the cycle of the latching action needs to be longer than an actually required cycle so as to secure sufficiently the variations of the output timings by ensuring that the number of oscillations are greater than a certain value as mentioned within one cycle of the latching action.

In the related art, a plurality of such oscillators is provided in parallel to increase the amount of the random number data. However, if any one of the oscillators is brought to a halt due to some factor, there may arise a problem that the level of the random number data generated from the corresponding oscillator is fixed to fail consequently in completely ensuring the security of the whole system including the oscillators.

SUMMARY OF THE INVENTION

The present invention has been accomplished for the purpose of solving the problems mentioned above. And, an object of the invention resides in providing an improved random number data generator which is capable of efficiently generating high-reliability random number data.

The above object can be achieved by providing a random number data generator which includes a plurality of oscillation means and an output timing control means for making at least one oscillation means output data generated by the at least one of the oscillation means as the random number data when all of the oscillation means have oscillated a predetermined number of times respectively.

According to such means, it becomes possible to determine the generation (output) of the random number data for the first time in response to the oscillation states in the plural oscillation means.

Here, the output timing control means may include, for example, a plurality of count means disposed correspondingly to the plural oscillation means respectively, each count means counting the number of oscillations of the corresponding oscillation means and outputting an activation signal when the counted number has reached a predetermined value, and AND operation means for computing the logical product of the signals outputted from the plural count means, wherein the AND operation means makes the at least one oscillation means output the random number data in response to the result of such computation, hence realizing the desired structure with facility.

Each of the count means decreases the initially set number of times when the counted number thereof has reached the predetermined value for the first time, thereby attaining a delay of the random number data generation timing only at the start of the operation of the oscillation means.

Each of the oscillation means includes noise generation means for generating a uniform-intensity noise with regard to a frequency and an amplifier means for amplifying the noise generated from the noise generator means, wherein the oscillation means oscillates in accordance with the signal amplified by the amplifier means, hence ensuring the randomness of the random number data.

Each of the oscillation means also includes a positive feedback, differential amplifier means and oscillates in accordance with the signal outputted from the differential amplifier means, whereby the circuit scale can be reduced.

Each of the oscillation means further includes fault detection means for detecting any operation fault in accordance with the signal outputted from the differential amplifier means, and when the output timing control means inhibits output of the random number data in response to a detection of any operation fault by the fault detection means, generation of the random number can be interrupted automatically upon an occurrence of any operation fault in the differential amplifier means.

The random number data generator further includes noise generation means for generating a noise whose intensity is uniform with regard to a frequency and an amplifier means for amplifying the noise generated by the noise generation means. Each of the oscillation means includes positive feedback differential amplifier means, wherein the oscillation means oscillates in accordance with the signal outputted from the differential amplifier means and the signal amplified by the amplifier means, so that the oscillation randomness in each oscillation means can be ensured by both the signal amplified by the amplifier means and the signal outputted from the differential amplifier means.

The above and other features and advantages of the present invention will become apparent from the following description, which will be given with reference to the illustrative accompanying drawings.

BRIEF DESCRIPTION OF THE DRAWINGS

FIGS. 2A to 2D are timing diagrams showing the operation of the random number data generator in FIG. 1;

FIG. 3 shows a modification of the amplifier circuit in FIG. 1; and

DESCRIPTION OF THE PREFERRED EMBODIMENTS

Figure 1:
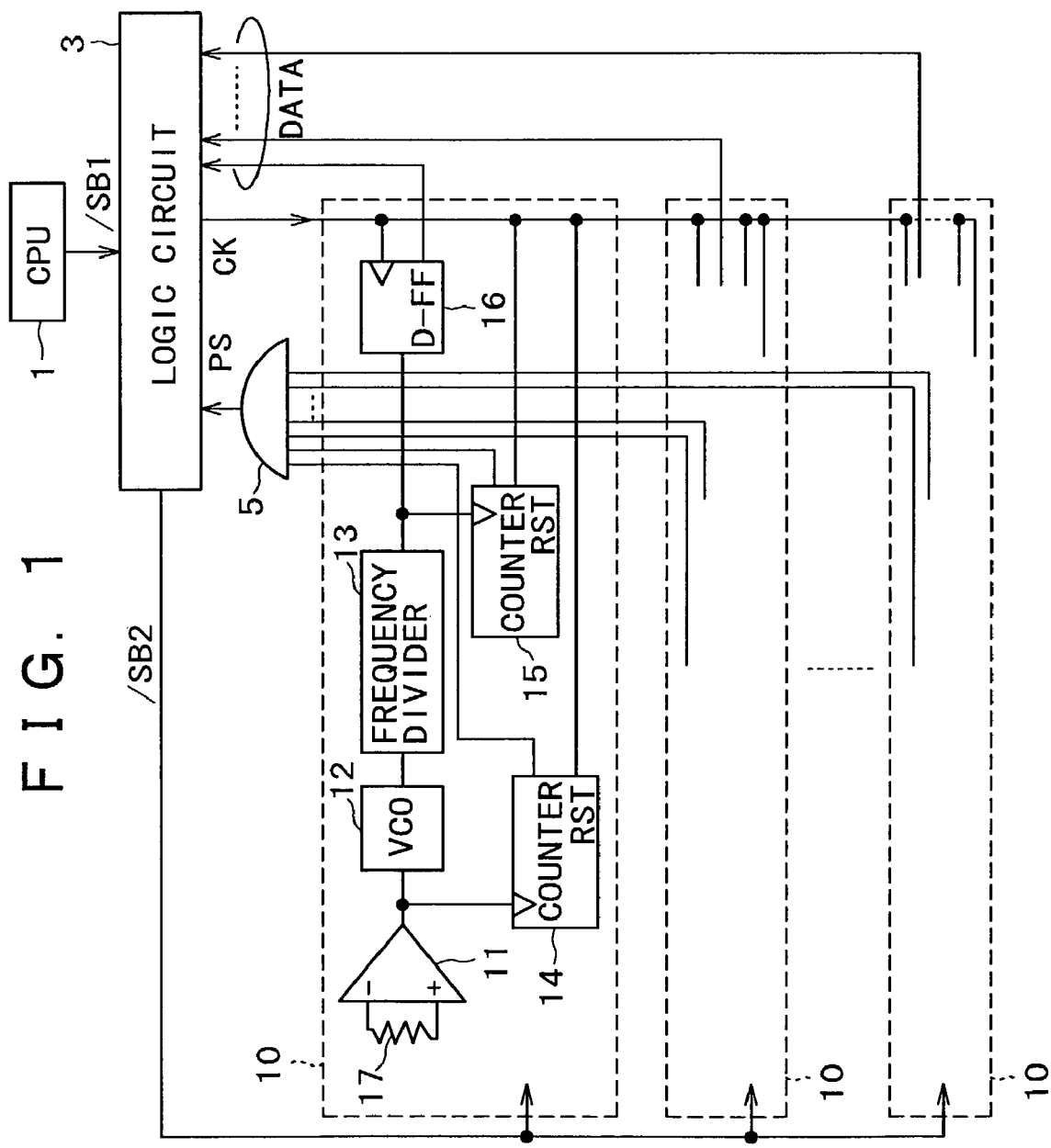
FIG. 1 shows the structure of a random number data generator according to a first embodiment of the present invention.

Hereinafter, some preferred embodiments of the present invention will be described in detail with reference to the accompanying drawings, wherein like reference numerals or symbols denote like or corresponding components.

First Embodiment

FIG. 1 is a block diagram showing the structure of a random number data generator according to a first embodiment of the present invention. As shown in FIG. 1, the random number data generator according to the first embodiment of the invention consists of a CPU 1, a logic circuit 3, an AND circuit 5, and a plurality of oscillation units 10. Each of the oscillation units 10 includes an amplifier 11, a voltage controlled oscillator (VCO) 12, a frequency divider 13, two counters 14 and 15, a delay flip-flop 16 and a resistor 17.

In the above configuration, the logic circuit 3 is connected to the CPU 1, and the plural oscillation units 10 are connected to the logic circuit 3. The resistor 17 is connected between the positive and negative input terminals of the amplifier 11, while the VCO 12 and the counter 14 are connected to the output terminal of the amplifier 11. The frequency divider 13 is connected to the VCO 12, and the counter 15 and the delay flip-flop 16 are connected to the output node of the frequency divider 13.

The output nodes of the counters 14 and 15 are connected to the input terminal of the AND circuit 5, and the output terminal of the AND circuit 5 is connected to the logic circuit 3. Meanwhile, the output node of the delay flip-flop 16 is connected to the logic circuit 3, and the reset nodes RST of the counters 14 and 15 and the reset node of the delay flip-flop 16 are connected to the logic circuit 3.

The VCOs 12 included individually in the plural oscillation units 10 are laid out in the same shape, and the respective average cycles are approximately equal.

Now, the operation of the random number data generator having the above structure will be described below with reference to the timing diagram of FIG. 2. Initially, the random number data generator is kept in its standby state where, as shown in FIG. 2A, the CPU 1 supplies a low-level (L) standby signal/SB1 to the logic circuit 3, and the logic circuit 3 supplies a low-level standby signal/SB2 to the plural oscillation units 10.

When the CPU 1 has turned the standby signal/SB1 to a high level (H) at a time point T1, as shown in FIG. 2A, the logic circuit 3 is activated to supply a high-level standby signal/SB2 to the plural oscillation units 10, whereby each oscillation unit 10 is activated to start its oscillation.

More specifically, the amplifier 11 is activated at the time point T1 to amplify consequently the thermal noise of the resistor 17. And, the analog signal generated by such amplification is supplied to the VCO 12, which then oscillates in response to the analog signal thus supplied. At this time, the VCO 12 generates and outputs a signal whose phase or cycle varies in accordance with fluctuations of the analog signal.

In the above, the thermal noise of the resistor 17 may desirably be replaced with a shot noise in a PN junction or the like where its intensity is uniform with regard to a frequency, ideally with a white noise.

Meanwhile, the counter 14 counts the number of oscillations of the amplifier 11 in accordance with the signal supplied from the amplifier 11. And, when the number of oscillations of the amplifier 11 has reached a predetermined value, the counter 14 supplies a high-level signal to the AND circuit 5. Here, the counter 14 serves to confirm whether the amplifier 11 is in its proper operation or not, and the predetermined value is considered sufficient if it is set to a small value.

That is, in case the amplifier 11 is rendered faulty to stop its oscillation as a result, the counter 14 becomes unable to count the number of oscillations up to the predetermined value and therefore keeps supplying a low-level signal to the AND circuit 5, so that a high-level signal PS indicative of activation is not supplied to the logic circuit 3. Consequently, an activating high-level clock signal CK is not supplied from the logic circuit 3 to the delay flip-flop 16, hence inhibiting the logic circuit 3 from using data DATA that are predictable with ease by a third party (as will be explained later in detail). Thus, the counter 14 is capable of a contribution for enhancing the stability of the whole system inclusive of the random number data generator.

On the other hand, the signal outputted from the VCO 12 is supplied to the frequency divider 13, which demultiplies the frequency to a half, for example, and then supplies the output signal to both the counter 15 and the delay flip-flop 16. At this time, the counter 15 counts the number of pulses supplied thereto from the frequency divider 13, and when the counted number has reached a preset value, the counter 15 supplies a high-level signal to the AND circuit 5. The counter 15 serves to ensure the security relative to the non-periodicity of the output timings of undermentioned data DATA, i.e., relative to the randomness of the data DATA, on the basis of more oscillations of the VCO 12 than the predetermined value thereof.

If the frequency divider 13 demultiplies the frequency to a half, as mentioned, it becomes possible to supply signals, where the appearance probability of "1" and that of "0" are approximately equal, to the delay flip-flop 16 without depending on the characteristic of the VCO 12, and hence ensuring a high-reliability operation regardless of the circuit characteristic of the VCO 12.

Thus, after more than the predetermined number of oscillations of the entire VCOs 12 is included in the plural oscillation units 10, the AND circuit 5 supplies a high-level signal PS to the logic circuit 3, as shown in FIG. 2B, at a time point T2 when the high-level signal is supplied from the entire counters 14 and 15 to the AND circuit 5.

Here, the oscillations of the individual VCOs 12 included in the plural oscillation units 10 are mutually independent in both phase and cycle thereof, so that a time Tsb between the time points T1 and T2 is not predictable.

As shown in FIG. 2C, the logic circuit 3 outputs a high-level clock signal CK after the lapse of a predetermined time Tdl from the time point T2. Then, in response to the high-level clock signal CK thus supplied, the delay flip-flop 16 outputs to the logic circuit 3 the valid data DATA supplied from the frequency divider 13 after the lapse of a time Tac from a time point T3, as shown in FIG. 2D. Since the data DATA takes a value of "1" or "0" in accordance with the output timing, it is also termed random number data.

As the high-level clock signal CK is supplied to the reset nodes RST of the counters 14 and 15, the counted numbers in the counters 14 and 15 are reset.

Due to the operation performed as described, the output timing of the data DATA obtained from each delay flip-flop 16 is rendered irregular, so that even when the clock signal CK is in synchronism with the system clock of a LSI including the random number data generator, prediction of the output data DATA by any third party is considered to be difficult, and hence enhancing the security of the LSI.

In the random number data generator according to the first embodiment, if merely one oscillation unit 10 alone is provided, the effect derived from the irregularity of the oscillation cycle of the VCO 12 is completely none, and therefore the output timings of the data DATA from the delay flip-flop 16 can be predicted with ease by a third party. Therefore, owing to the provision of plural oscillation units 10 with internal VCOs 12 whose oscillation cycles are substantially equal to each other, it becomes possible to prevent any third party from predicting which one of the VCOs 12 has the longest oscillation cycle.

In the random number data generator mentioned above, when its environments inclusive of the supply voltage and so forth are kept stable, similar data DATA are outputted each time immediately after a release from the standby state. Therefore, it is desired in each oscillation unit 10 that, in order to secure the randomness of the data DATA, the number of oscillations by each VCO 12 is monitored to be slightly more only after a release from the standby state. For this purpose, the value preset in the counter 15 until initial output of the data DATA is greater than the value set after the actual output of the data DATA.

Supposing now that a value V1 is preset in the counter 15, for example, at a release from its standby state, the preset value V1 is updated to a smaller value V2 upon an output of a high-level signal to the AND circuit 5 when the number counted by the counter 15 has reached the preset value V1.

Further, the amplifier 11 of a very large scale is required for amplifying the thermal noise in the resistor 17, as mentioned. Therefore, oscillations by a differential amplifier 21 shown in FIG. 3 may be utilized instead of amplifying the thermal noise by the amplifier 11, hence reducing the circuit scale of the random number data generator.

As shown in FIG. 3, the differential amplifier 21 has a positive feedback structure wherein a positive output node is connected to a negative input node, and a negative output node is connected to a positive input node. Since an oscillatory operation thereof is affected by thermal noise to a certain degree, it is consequently difficult for any third party to predict the data DATA outputted from each oscillation unit 10.

If the layout is so designed that the oscillation cycles are slightly different between a plurality of differential amplifiers 21, e.g., the sizes of transistors constituting the differential amplifiers 21 become mutually different, then the mutual phase difference between the output signals of the plural VCOs 12 is changed irregularly, so that prediction of the output data by any third party is rendered more difficult to thereby further enhance the security of the whole system including the random number data generator.

Thus, according to the random number data generator of the first embodiment representing the present invention, there are contained therein a plurality of oscillation units 10, including internal VCOs 12 to perform oscillations of mutually different phases or cycles, and an AND circuit 5 for outputting the data DATA generated in each oscillation unit 10 when the oscillations of the entire oscillation units 10 have reached a predetermined number respectively, hence acquiring many high-reliability data DATA (random number data) efficiently.

Second Embodiment

Figure 4:
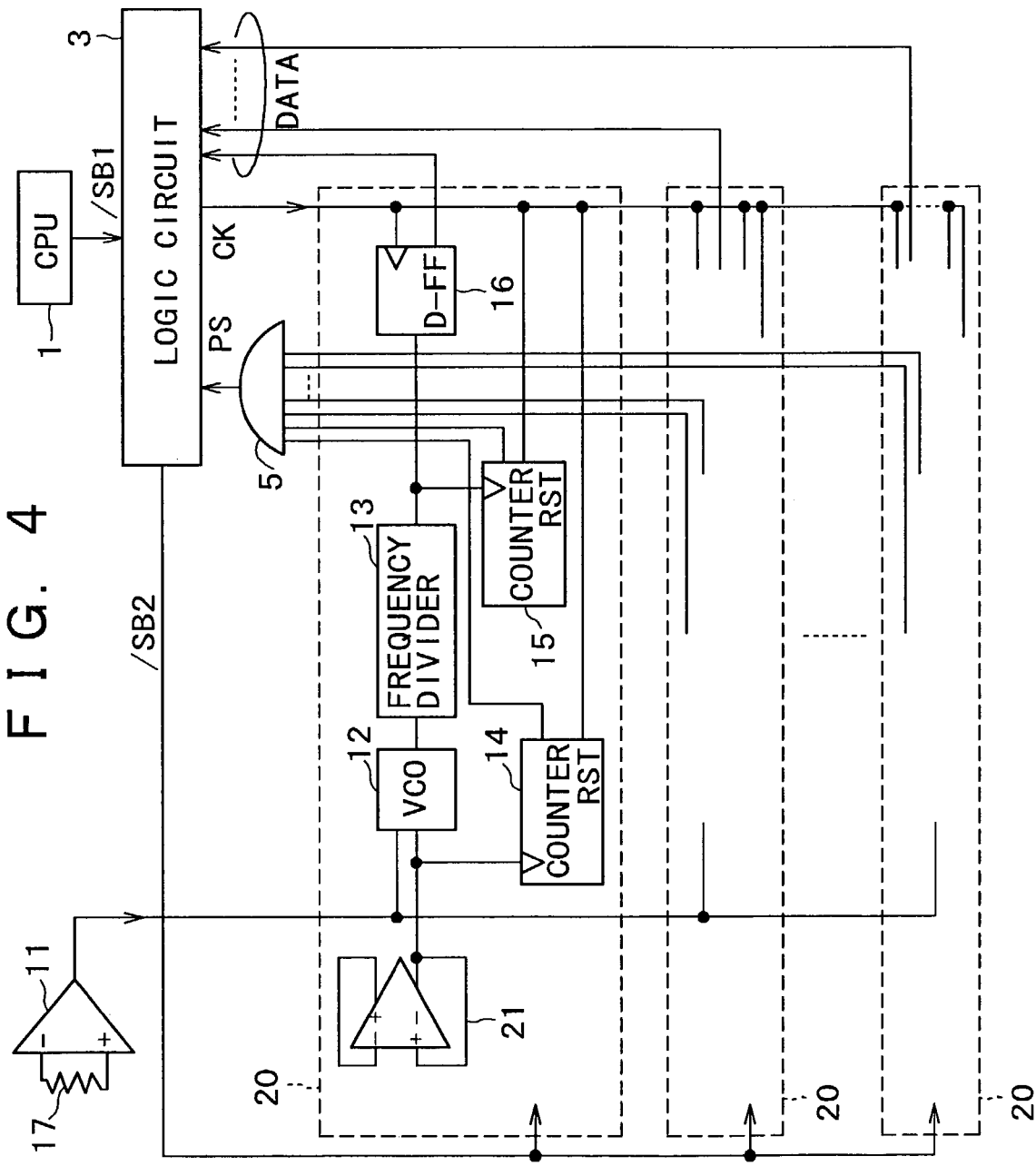
FIG. 4 shows the structure of a random number data generator according to a second embodiment of the present invention.

FIG. 4 is a block diagram showing the structure of a random number data generator according to a second embodiment of the present invention. As shown in FIG. 4, the random number data generator according to the second embodiment of the invention is structurally the same as the aforementioned random number data generator of the first embodiment, with the exception that each of the VCOs 12 is supplied not only with the output signal of the differential amplifier 21 included in the corresponding oscillation unit 10 but also with the signal outputted from the amplifier 11 which is common to the plural oscillation units 10.

In the random number data generator of the second embodiment having the above structure, the operation performed is the same as in the foregoing random number data generator of the first embodiment, wherein each VCO 12 is supplied with a signal produced by amplifying thermal noise whose intensity is uniform to a frequency and a signal produced by oscillation of the differential amplifier 21.

According to the random number data generator of the second embodiment of the present invention, the achieved advantageous effects are the same as those attainable in the random number data generator of the first embodiment, and while the randomness of the entire oscillations in the plural VCOs 12 is ensured by the signal supplied from the amplifier 11, the mutual oscillation randomness between the VCOs 12 can be secured by the differential amplifier 21 included in each oscillation unit 10, so that prediction of the output data DATA by any third party is rendered more difficult and consequently enhancing the security of the whole system inclusive of the random number data generator.

Thus, in the random number data generator of the present invention, generation of random number data can be determined for the first time in accordance with the state of oscillations in a plurality of oscillation means, hence obtaining highly reliable random number data efficiently.

What is claimed is:

1. A random number data generator for generating random number data, comprising:
    a plurality of oscillation means; and
    output timing control means for making at least one of said oscillation means output data generated by the at least one of said oscillation means as the random number data when all of the oscillation means have oscillated a predetermined number of times respectively.

2. The random number data generator according to claim 1, wherein said output timing control means includes a plurality of count means provided correspondingly to said plurality of oscillation means respectively, each count means counting the number of oscillations of the corresponding oscillation means and outputting an activation signal when the counted number has reached a predetermined value, and AND operation means for computing the logical product of the signals outputted from said plurality of count means,
    wherein said AND operation means makes the at least one of said oscillation means output the random number data in response to the result of such computation.

3. The random number data generator according to claim 2, wherein each of said count means decreases the initially set number of times when the counted number has reached the predetermined value for the first time.

4. The random number data generator according to claim 1, wherein each of said oscillation means comprises noise generation means for generating a noise whose intensity is uniform with regard to a frequency, and amplifier means for amplifying the noise generated by said noise generation means, wherein each oscillation means oscillates in accordance with the signal amplified by said amplifier means.

5. The random number data generator according to claim 4, wherein each of said oscillation means further comprises fault detection means for detecting any operation fault in accordance with the signal outputted from said amplifier means, and said output timing control means inhibits output of the random number data in response to a detection of any operation fault by said fault detection means.

6. The random number data generator according to claim 1, wherein each of said oscillation means comprises positive feedback differential amplifier means and oscillates in accordance with the signal outputted from said differential amplifier means.

7. The random number data generator according to claim 6, wherein said output timing control means comprises a plurality of count means provided correspondingly to said plurality of oscillation means respectively, each count means counting the number of oscillations of the corresponding oscillation means and outputting an activation signal when the counted number has reached a predetermined value, and AND operation means for computing the logical product of the signals outputted from said plurality of count means, wherein said AND operation means makes the at least one of said oscillation means output the random number data in response to the result of such computation.

8. The random number data generator according to claim 7, wherein each of said count means decreases the initially set number of times when the counted number has reached the predetermined value for the first time.

9. The random number data generator according to claim 6, wherein each of said oscillation means further comprises fault detection means for detecting any operation fault in accordance with the signal outputted from said differential amplifier means, and said output timing control means inhibits output of the random number data in response to a detection of any operation fault by said fault detection means.

10. The random number data generator according to claim 1, further comprising noise generation means for generating a noise whose intensity is uniform with regard to a frequency, and amplifier means for amplifying the noise generated by said noise generation means, wherein each of said oscillation means includes positive feedback differential amplifier means, and oscillates in accordance with the signal outputted from said differential amplifier means and the signal amplified by said amplifier means.

11. The random number data generator according to claim 10, wherein said output timing control means comprises a plurality of count means provided correspondingly to said plurality of oscillation means respectively, each count means counting the number of oscillations of the corresponding oscillation means and outputting an activation signal when the counted number has reached a predetermined value, and AND operation means for computing the logical product of the signals outputted from said plurality of count means, wherein said AND operation means makes the at least one of said oscillation means output the random number data in response to the result of such computation.

12. The random number data generator according to claim 11, wherein each of said count means decreases the initially set number of times when the counted number has reached the predetermined value for the first time.

13. The random number data generator according to claim 10, wherein each of said oscillation means further comprises fault detection means for detecting any operation fault in accordance with the signal outputted from said differential amplifier means, and said output timing control means inhibits output of the random number data in response to a detection of any operation fault by said fault detection means.

* * * * *